(12) United States Patent
Farhan et al.

(10) Patent No.: US 10,601,912 B2
(45) Date of Patent: Mar. 24, 2020

(54) SYSTEM AND METHOD FOR DEVICE POLICY EXCHANGE IN A NETWORK OF DEVICES WITH EMBEDDED ELECTRONICS

(71) Applicant: Dell Products, LP, Round Rock, TX (US)

(72) Inventors: Munif Farhan, Round Rock, TX (US); Liam B. Quinn, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 389 days.

(21) Appl. No.: 14/788,002

(22) Filed: Jun. 30, 2015

(65) Prior Publication Data

US 2017/0006093 A1    Jan. 5, 2017

(51) Int. Cl.
*G06F 15/177* (2006.01)
*H04L 29/08* (2006.01)

(52) U.S. Cl.
CPC ........ *H04L 67/1061* (2013.01); *H04L 67/303* (2013.01)

(58) Field of Classification Search
CPC ........................... H04L 67/2852; H04L 67/02
USPC ........................................................ 709/219
See application file for complete search history.

(56) References Cited

U.S. PATENT DOCUMENTS

| | | | |
|---|---|---|---|
| 8,925,048 B2 | 12/2014 | Yoon et al. | |
| 2004/0025014 A1 | 2/2004 | Kaler et al. | |
| 2007/0294422 A1* | 12/2007 | Zuckerman | G06F 17/30206 709/230 |
| 2011/0161468 A1* | 6/2011 | Tuckey | H04L 41/0803 709/220 |
| 2011/0231927 A1 | 9/2011 | Tovar | |
| 2014/0012913 A1* | 1/2014 | Varoglu | H04L 41/0806 709/204 |
| 2015/0026758 A1* | 1/2015 | Payyappilly | H04W 4/00 726/1 |
| 2015/0094093 A1* | 4/2015 | Pierce | H04W 64/00 455/456.3 |
| 2015/0161616 A1* | 6/2015 | Brunet | G06Q 30/016 713/1 |
| 2015/0227426 A1* | 8/2015 | Andrade Costa | G06F 11/1415 714/47.3 |
| 2015/0326823 A1* | 11/2015 | Oh | H04L 65/1059 348/14.07 |
| 2016/0086168 A1* | 3/2016 | McKelvey | G06Q 20/34 705/71 |

\* cited by examiner

*Primary Examiner* — Umar Cheema
*Assistant Examiner* — Hannah S Wang
(74) *Attorney, Agent, or Firm* — Larson Newman, LLP (57) ABSTRACT

An information handling system include a memory and a processor that determines that the information handling system is of a first class of devices, receives a first profile from a management system, the first profile being for the first class of devices, receives a second profile from the management system, the second profile being for a second class of devices, the second class being different from the first class, couples to a peer device, determines whether the peer device is of the first class of device or the second class of devices, and sends the first profile to the peer device in response to determining that the peer device is of the first class of devices.

14 Claims, 8 Drawing Sheets

SYSTEM AND METHOD FOR DEVICE POLICY EXCHANGE IN A NETWORK OF DEVICES WITH EMBEDDED ELECTRONICS

CROSS REFERENCE TO RELATED APPLICATIONS

Related subject matter is contained in co-pending U.S. patent application Ser. No. 14/755,921 entitled "System and Method for Device Optimization in a Network of Devices with Embedded Electronics," filed of even date herewith, the disclosure of which is hereby incorporated by reference.

Related subject matter is contained in co-pending U.S. patent application Ser. No. 14/75,5973 entitled "System and Method for Implementing an Ecosystem based on Policy Exchanges in a Network of Devices with Embedded Electronics," filed of even date herewith, the disclosure of which is hereby incorporated by reference.

FIELD OF THE DISCLOSURE

This disclosure generally relates to information handling systems, and more particularly relates to a system and method for device policy exchange in a network of devices with embedded electronics.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
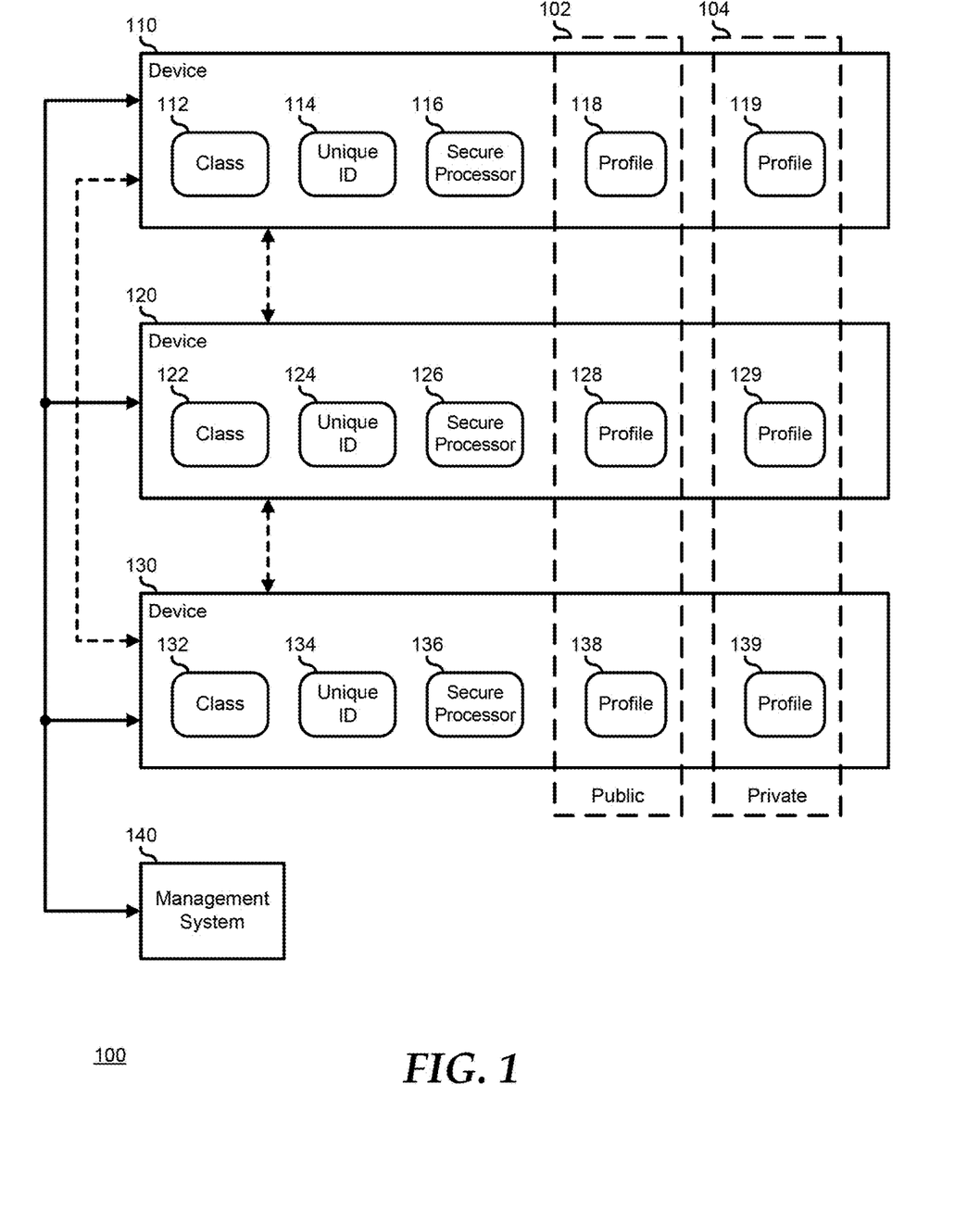
FIGS. 1-3 are block diagrams illustrating a device network according to various embodiments of the present disclosure.

FIG. 1 illustrates an embodiment of a device network 100. For the purpose of this disclosure, device network 100 can be implemented by one or more information handling systems and can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Device network 100 includes devices 110, 120, and 130, and a management system 140. An example of device network 100 includes an Internet-of-Things (IoT), or another network of devices with embedded electronics, software, sensors, and connectivity, where the network achieves a greater value by virtue of the interconnections between the devices. Each of devices 110, 120, and 130 represent physical devices which include an embedded information handling system, such as a microcontroller, a System-on-a-Chip (SoC), a dedicated controller, or the like, and includes one or more communication interfaces. An example of a communication interface includes a wired communication interface, such as an Ethernet interface, a fiber-optic interface, or the like, a wireless communication interface, such as a WiFi interface, a WiMax interface, a Bluetooth interface, a Personal Area Network (PAN) interface, or the like. Devices 110, 120, and 130 can represent devices whose primary function is information processing, such as devices in a data center, an office network, or the like, devices whose primary function is other than information processing, such as connected appliances, smart apparel, personal trackers, and the like, or a combination thereof. Devices 110, 120, and 130 are connected to each other via one or more of the communication interfaces to form a peer-to-peer (P2P) network, as indicated by the dashed lines between the devices.

Devices 110, 120, and 130 each include respective class identifications 112, 122, and 132, unique identifications 114, 124, and 134, secure data processors 116. 126, and 136, and profile information 118 and 119, 128 and 129, and 138 and 139. Class identifications 112, 122, and 132 represent information that identifies the types for respective devices 110, 120, and 130, and can include various types of data processing devices, display devices, connected appliances, smart apparel, personal trackers, or other types of devices that include an embedded information handling capability. Moreover, class identifications 112, 122, and 132 can indicate that respective devices 110, 120, and 130 are the same or similar types of devices, or can indicate that the respective devices are vastly different types of devices.

Unique identifications 114, 124, and 134 represent information that uniquely indentifies respective devices 110, 120, and 130 within their respective classes, as identified by respective class identifications 112, 122, and 132. An example of unique identification information includes a serial number, such as might be ascribed by a manufacture of the device, an asset tag number, such as might be ascribed by and end user of the device, or the like.

Secure processors 116, 126, and 136 represent a security co-processor, such as a Trusted Platform Module or the like, or security routines associated with the embedded electronics of respective devices 110, 120, and 130. The functions and features of secure processors 116, 126, and 136 will be described more fully, below.

Profiles 118, 119, 128, 129, 138, and 139 represent information that describes the functions and features of respective devices 110, 120, and 130, and includes the operational settings for the functions and features. The profiles are divided up into public profiles 102, including profiles 118, 128, and 138, and 139, and private profiles 104, including profiles 119, 129, and 139. Public profiles 102 represent functions, features, and operational settings that are freely accessible, while private profiles 104 represent functions, features, and operations that are restricted as to who has access. For example, where device 110 represents a conference room display device, public profile 118 can provide that any user who connects a source device to the display device may use the display without authentication. On the other hand, private profile 119 can provide that, after the user disconnects from the display device, the display device waits five minutes before entering a standby mode. In this case, it may be desirable that the access to the standby mode delay time setting not be accessible to any device that connects to the display device, but only to an authorized device. In a particular embodiment, one or more of secure processors 116, 126, and 136 can be utilized in authenticating the access to private profiles 104. In another embodiment, one or more of profiles 118, 119, 128, 129, 138, and 139 includes firmware for respective devices 110, 120, and 130. Profiles 118, 119, 128, 129, 138, and 139 can include access attributes such as read-only, read/write, or private.

Management system 140 is connected to devices 110, 120, and 130, and represents an information handling system that operates to provide one or more of profiles 118, 119, 128, 129, 138, and 139 to respective devices 110, 120, and 130. Here, management system 140 can operate to manage and update public profiles 102. For example, management system 140 can represent a device manufacturer's system that is configured to automatically update one or more of profiles 118, 128, and 138 when a respective device 110, 120, or 130 is connected to the management system. In this way, firmware updates can be automatically loaded to provide critical updates and the like, or the functions, features, and operational settings can be reprogrammed to conform with more recent best practices. Management system 140 can also operate to manage and update private profiles 104. For example, management system 140 can represent a system operated by an organization that operates and maintains devices 110, 120, and 130, and the system can automatically update one or more of profiles 119, 129, and 139 when a respective device 110, 120, or 130 is connected to the management system. In this way, firmware revision control can be maintained by the organization, and the functions, features, and operational settings can be reprogrammed to conform with policies established by the organization. Devices 110, 120, and 130 are also interconnected with each other, and can operate to provide updates to public profiles 102 and private profiles 104, as described below.

Figure 2:
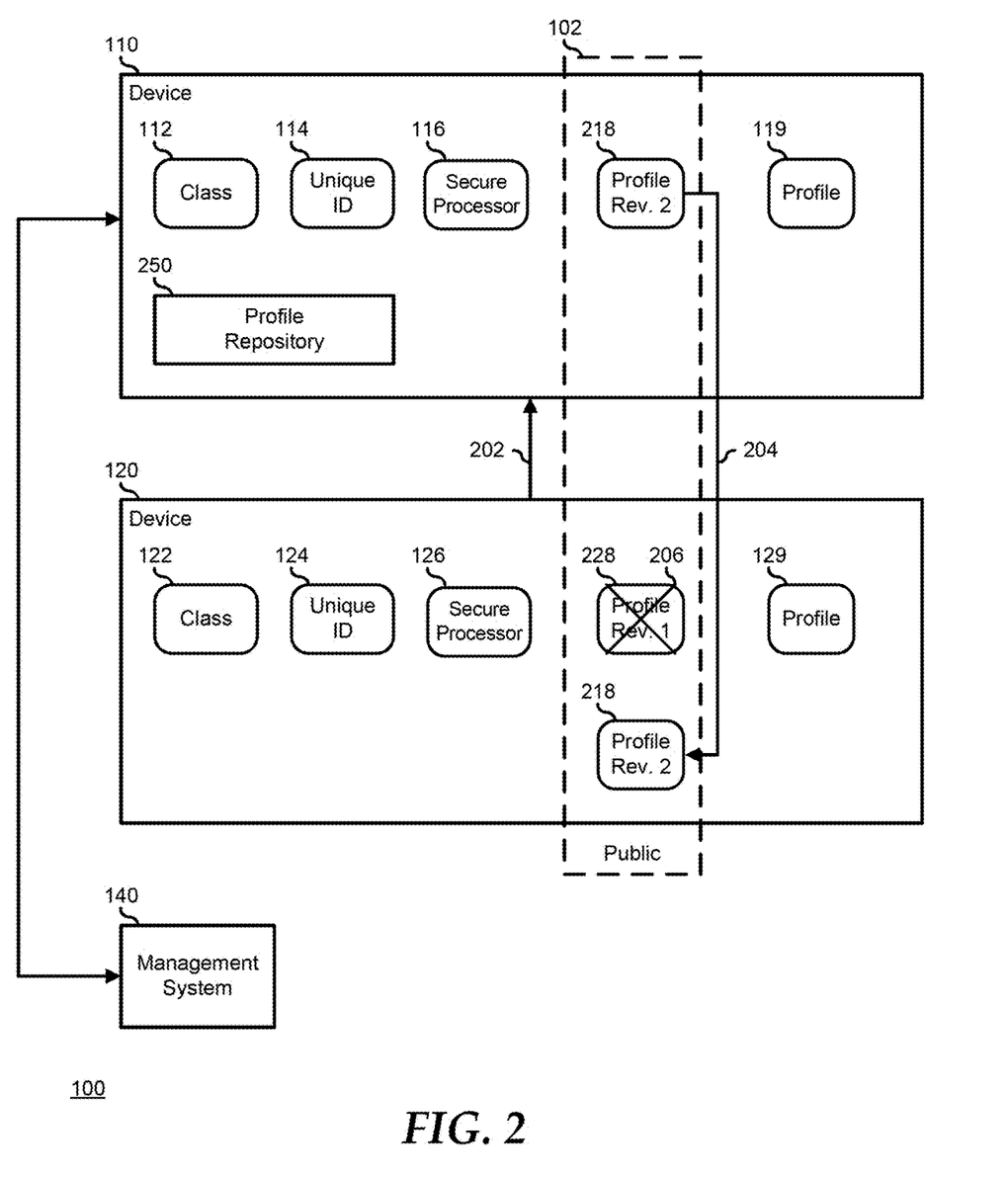

FIG. 2 illustrates an embodiment of device network 100 where device 110 is connected to management system 140, but device 120 is not connected to the management system. In a particular embodiment, one or more of devices 110, 120, and 130 operate to propagate a newer public profile to another device that has an older profile. Here, device 110 has received a new public profile 218. The newness of profile 218 can be determined based upon a date stamp, a profile or code revision number, or another method of determining the relative newness of the profile. In another embodiment, one or more of devices 110, 120, and 130 operate to propagate a valid profile to replace an invalid profile, without regard to the newness of the replaced profile. For example, a later in time profile may be limited as to the duration for which it is valid, such as where a profile has an expiration date or a "valid for x duration" property. Here, the expired profile may be replaced by an earlier in time profile that remains valid.

In either case, device 110 includes profile 218 that is either newer or that remains valid, as indicated by the revision number "2" associated with the profile, and device 120 includes a profile 228 that is either older or invalid, as indicated by the revision number "1" associated with the profile. Devices 110 and 120 communicate 202 with each other as to the status of profiles 218 and 228 via the P2P link between them. In a particular embodiment, communication 202 represents device 120 pushing the status of profile 228 to device 110 based upon a periodic update, or in response to a query from device 110. Here, device 110 compares the status of profile 218 with the status of profile 228 and makes a determination as to whether or not to update device 120 with profile 218. If device 110 determines to update device 120 with profile 218, then device 110 communicates 204 the profile to device 120, and device 120 deletes 206 profile 228 and replaces it with profile 218. Here, device 120 can now provide profile 218 to other devices, such as to device 130 in the same way that device 110 provided the profile to device 120. This mode of profile updates is referred to as the infectious mode. The skilled artisan will recognize that device 110 can provide the status of profile 218 to device 120, that device 120 can perform the comparison to determine that profile 218 is newer or remains valid over profile 228, and that device 120 can then request profile 218 from device 110.

In the simplest case, as describe above, devices 110 and 120 are members of the same class, such that profiles 218 and 228 are directly substitutable for each other. In another embodiment, devices 110 and 120 are members of the similar classes, such that profiles 218 and 228 are not directly substitutable for each other, but include similar fields for which the fields can be substituted, such as where each device includes a standby mode delay time setting. In yet another embodiment, one or more of devices 110, 120, and 130 can include a profile repository 250 that retains profiles for completely different class devices. Here, for example, device 110 can be commonly associated with devices of certain other, completely different classes, such as where a laptop computer is commonly coupled to a smart phone and to a conference room projector. In this case, the laptop computer can store profiles for the smart phone and for the conference room projector in profile repository 250, even though such profiles have little to no bearing on the functions, features, and settings of the laptop computer. In this way, the laptop computer can still update the public profiles of the smart phone and the conference room projector device by comparing the profiles of the actual devices with the profiles in profile repository 250.

Figure 3:
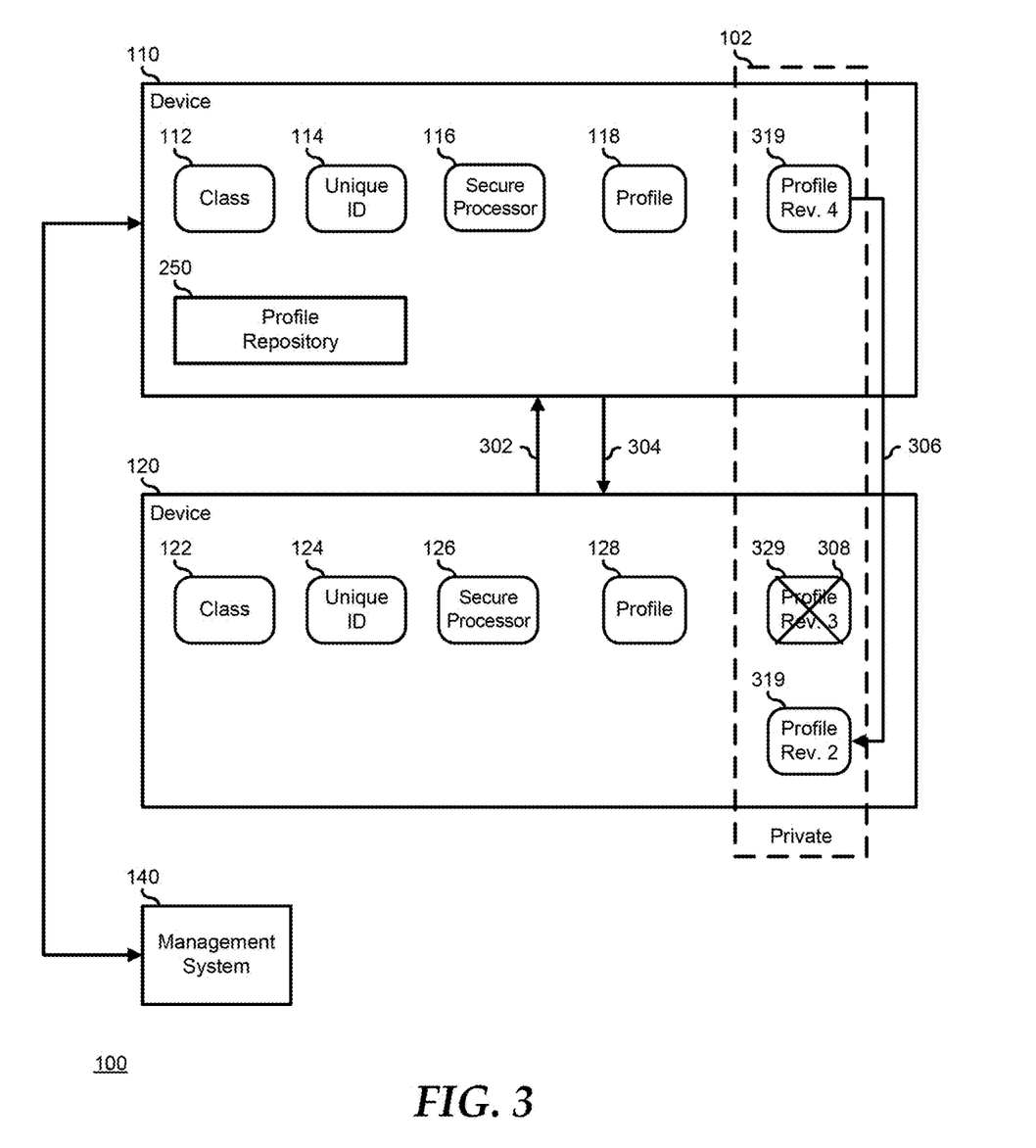

FIG. 3 illustrates another embodiment of device network 100 where device 110 is connected to management system 140, but device 120 is not connected to the management system. In a particular embodiment, one or more of devices 110, 120, and 130 operate to propagate a newer private profile to another device that has an older profile, as described above. In another embodiment, one or more of devices 110, 120, and 130 operate to propagate a valid profile to replace an invalid profile, without regard to the newness of the replaced profile.

In either case, device 110 includes a profile 319 that is either newer or that remains valid, as indicated by the revision number "4" associated with the profile, and device 120 includes a profile 329 that is either older or invalid, as indicated by the revision number "3" associated with the profile. Devices 110 and 120 communicate 302 with each other as to the status of profiles 319 and 329 via the P2P link between them, via either a push type transaction or a query/response type transaction, as described above. Here, device 110 authenticates 304 device 120 as being a part of the private network associated with device 110. In a particular embodiment, device 110 authenticates device 120 via secure processor 116, such as by authenticating a hash of profile 329 as being associated with private profiles 104, or by device 120 providing a digital signature to device 110. If device 120 is authenticated, device 110 compares the status of profile 319 with the status of profile 329 and makes a determination as to whether or not to update device 120 with profile 319. If device 110 determines to update device 120 with profile 319, then device 110 communicates 306 the profile to device 120, and device 120 deletes 308 profile 329 and replaces it with profile 319. Here, device 120 can now provide authenticate other devices and profile 319 to the other devices, such as to device 130 in the same way that device 110 provided the profile to device 120. This mode of profile updates is referred to as the infectious mode.

Figure 4:
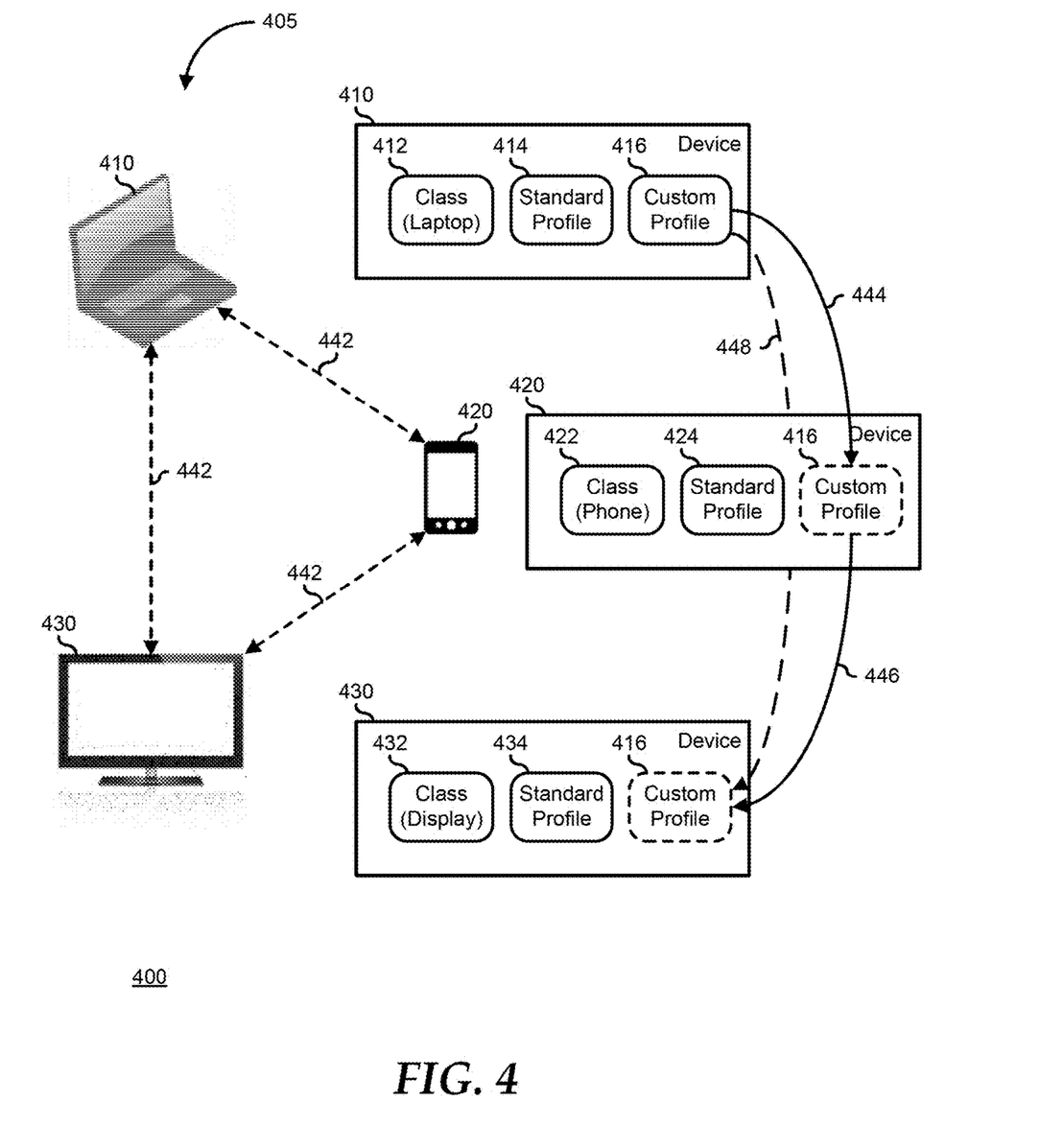
FIG. 4 is a block diagram illustrating a device network for implementing an ecosystem according to another embodiment of the present disclosure.

FIG. 4 illustrates another embodiment of a device network 400 similar to device network 100, and including devices 410, 420, and 430. Devices 410, 420, and 430 include respective class identifications 412, 422, and 432, and standard profiles 414, 424, and 434. In addition, device 410 includes a custom profile 416. Devices 410, 420, and 430 represent devices which are defined to form a particular ecosystem 405. Ecosystem 405 represents a grouping of devices which are commonly associated with each other for a particular purpose. For example, device 410 is illustrated as representing a laptop computer, device 420 is illustrated as representing a smart phone, and device 430 is illustrated as representing a display device.

Here, ecosystem 405 is illustrative of a meeting environment where a user of a laptop computer intends to present information on a display. In such circumstance, the laptop computer can be detected by the display device and by the user's smart phone. The laptop computer can propagate a custom profile associated with meeting setup mode, where the display device can be set to a power-on stand-by mode, and the smart phone can be left in its normal operating mode. The custom profile can also be associated with a presentation mode where the display device can be set to a display mode to display the contents from the laptop computer, the smart phone can be set to a silent operating mode, and the laptop computer can be set to a silence background processes mode.

In operation, device 410 establishes ecosystem 405 by defining the class of devices that compose the ecosystem, and the behavior of the devices while associated in the ecosystem. Table 1 illustrates an example of an ecosystem established by a device.

TABLE 1

| | Meeting Ecosystem | | | | | |
|---|---|---|---|---|---|---|
| Class | Laptop (Master) | | Smart Phone | | Display Device | |
| Profile | Standard | Present | Standard | Present | Standard | Standby Present |
| Action | N/A | SilentBG | N/A | Silent | N/A | P-On Display |

Next, when device 410 detects 442 the presence of devices 420 and 430, device 410 determines that the aggregation of devices 410, 420, and 430 represent the classes of devices that compose the meeting ecosystem 405. In response, device 410 switches operation from standard profile 414 to custom profile 416, device 410 propagates 444 the custom profile to device 420, and device 420 propagates the custom profile to device 430. In an alternative embodiment, device 410 propagates 444 custom profile 416 to device 420, and also propagates 448 the custom profile to device 430. In either case, device 420 switches operation from standard profile 424 to custom profile 416, and device 430 switches operation from standard profile 434 to the custom profile. After custom profile 416 is propagated to devices 420 and 430, but before the user of device 410 begins the presentation, device 430 goes into the power-on stand-by mode in accordance with the standby portion of the custom profile. Then, when the user begins to display the presentation, device 410 switches to the silence background processes mode, device 420 switches to silent operating mode, and device 430 goes into the display mode in accordance with the display portion of custom profile 416. An ecosystem can be derived from ecosystem 405, such that a subset of the associated classes still triggers the invocation of a custom profile. For example, it may be determined that the presence of a smart phone is not necessary to the desired features of the meeting eco-system, and so only the presence of a display device may be needed to invoke the custom profile.

Figure 5:
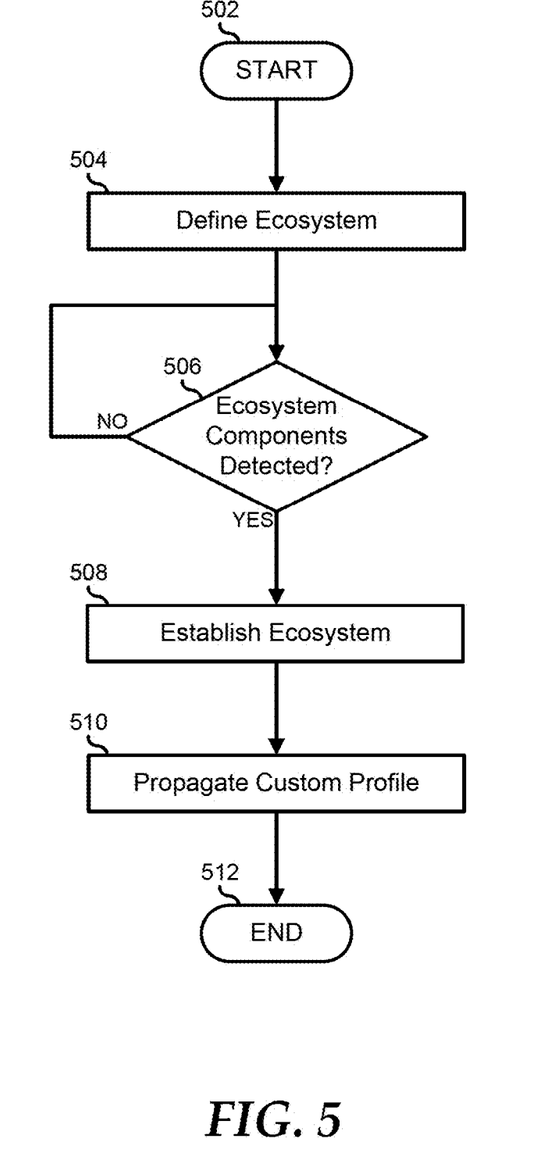
FIG. 5 is a flowchart illustrating a method of implementing an ecosystem in a device network according to an embodiment of the present disclosure.

FIG. 5 illustrates a method of implementing an ecosystem in a device network similar to device network 400, starting at block 502. An ecosystem is defined in a master device of a device network in block 504. For example, device 410 can define the meeting ecosystem of Table 1. A decision is made as to whether the component devices that compose the ecosystem are present in decision block 506. If not, the "NO" branch of decision block 506 is taken and the method loops back to the decision block until such time as the component devices that compose the ecosystem are present. If the component devices that compose the ecosystem are present, the "YES" branch of decision block 506 is taken and the ecosystem is established in block 508. For example, devices 410, 420, and 430 can be detected 422 to establish ecosystem 405. The master device propagates a custom profile to the device of the ecosystem in block 510 and the method ends in block 512. For example, device 410 can propagate custom profile 416 to devices 420 and 430, and the devices can proceed in accordance with the custom profile as described above.

Figure 6:
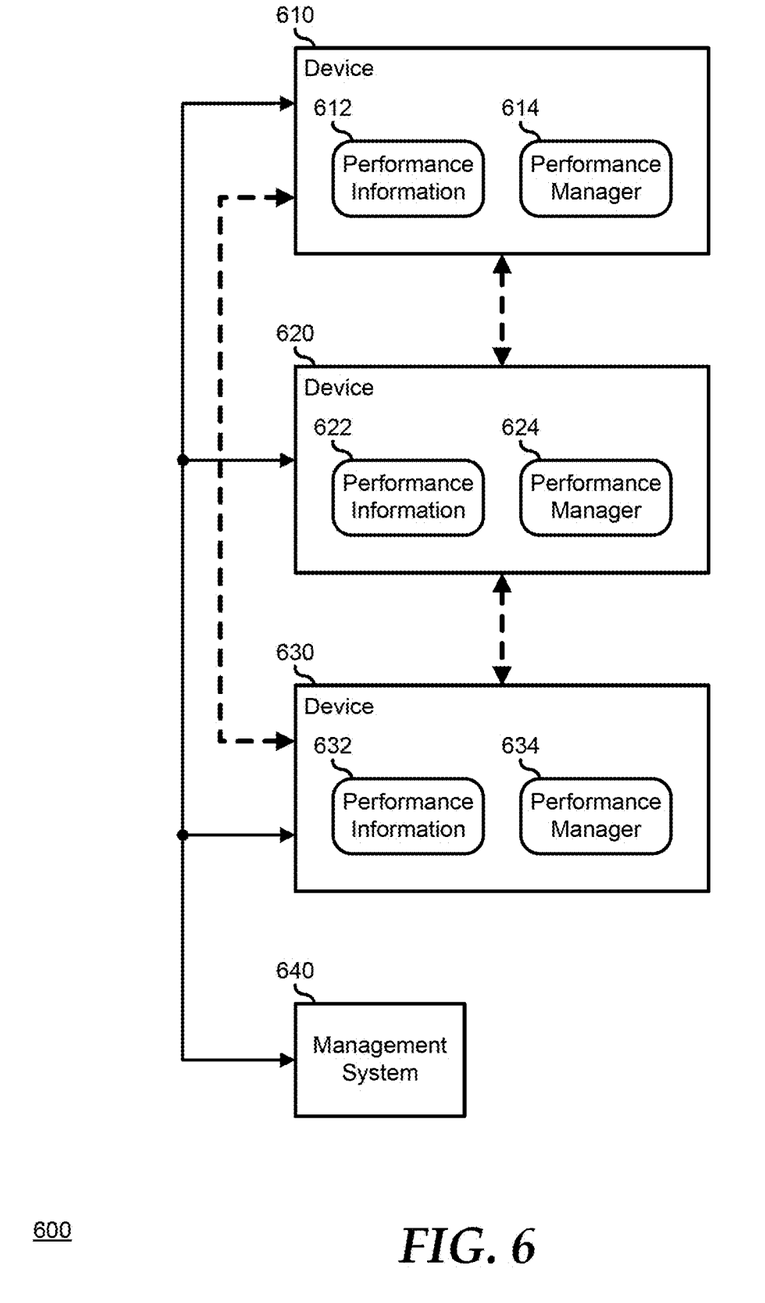
FIG. 6 is a block diagram illustrating a device network according to another embodiment of the present disclosure.

FIG. 6 illustrates another embodiment of a device network 600 similar to device network 100, and including devices 610, 620, and 630, and a management system 640 similar to management system 140. Devices 610, 620, and 630 are connected to each other via one or more of the communication interfaces to form a peer-to-peer (P2P) network, as indicated by the dashed lines between the devices. Devices 610, 620, and 630 each include respective performance information 612, 622, and 632, and performance managers 614, 524, and 634.

Performance information 612, 622, and 632 represent information related to the health and performance of respective devices 610, 620, and 630. An example of performance information includes various data processing metrics, such as available storage capacity, available storage bandwidth, current storage bandwidth utilization, CPU loading, GPU loading, memory utilization, operating temperatures, data usage, appliance usage metrics, or other types of performance information related to the device class, as needed or desired.

Performance managers 614, 624, and 634 represent functions, features, and operational settings of respective devices 610, 620, and 630 that can be manipulated to optimize the performance of the devices. As such, the manipulation of the functions, features, and operational settings of each performance manager 614, 624, and 634 will be reflected in changes in the respective performance information 612, 622, and 632.

Device network 600 operates such that each of devices 610, 620, and 630 shares its respective performance information 612, 622, and 632 with the other devices. Then each of devices 610, 620, and 630 analyzes its own performance information 612, 622, and 632 against the received performance information to determine if, relative to the peer devices, each device is operating consistently. If one or more of devices 610, 620, or 630 detects a discrepancy in its own performance as compared with the performance of the other devices, then the devices that are experiencing the discrepancy will utilize its respective performance manager 614, 624, or 634 to manipulate its own functions, features, and operational settings to improve its performance as compared to its peer devices. In a particular embodiment, when a device 610, 620, or 630 detects a discrepancy in its own performance as compared with the performance of the other devices, then the device requests the performance settings of the peer devices to assist in determining a corrective action to improve its performance.

Management system 640 is connected to devices 610, 620, and 630. Management system 640 operates to receive performance information 612, 622, and 632, and to make determinations as to the health of device network 600. For example, if simultaneously each of devices 610, 620, and 630 experience a performance drop, management system 640 can determine that device network 600 is experiencing a denial of service attack or another cause of degradation. Management system 640 also operates to direct performance managers 614, 624, and 634 to manipulate the functions, features, and operational settings of devices 610, 620, and 630 in response to the various health determinations.

Figure 7:
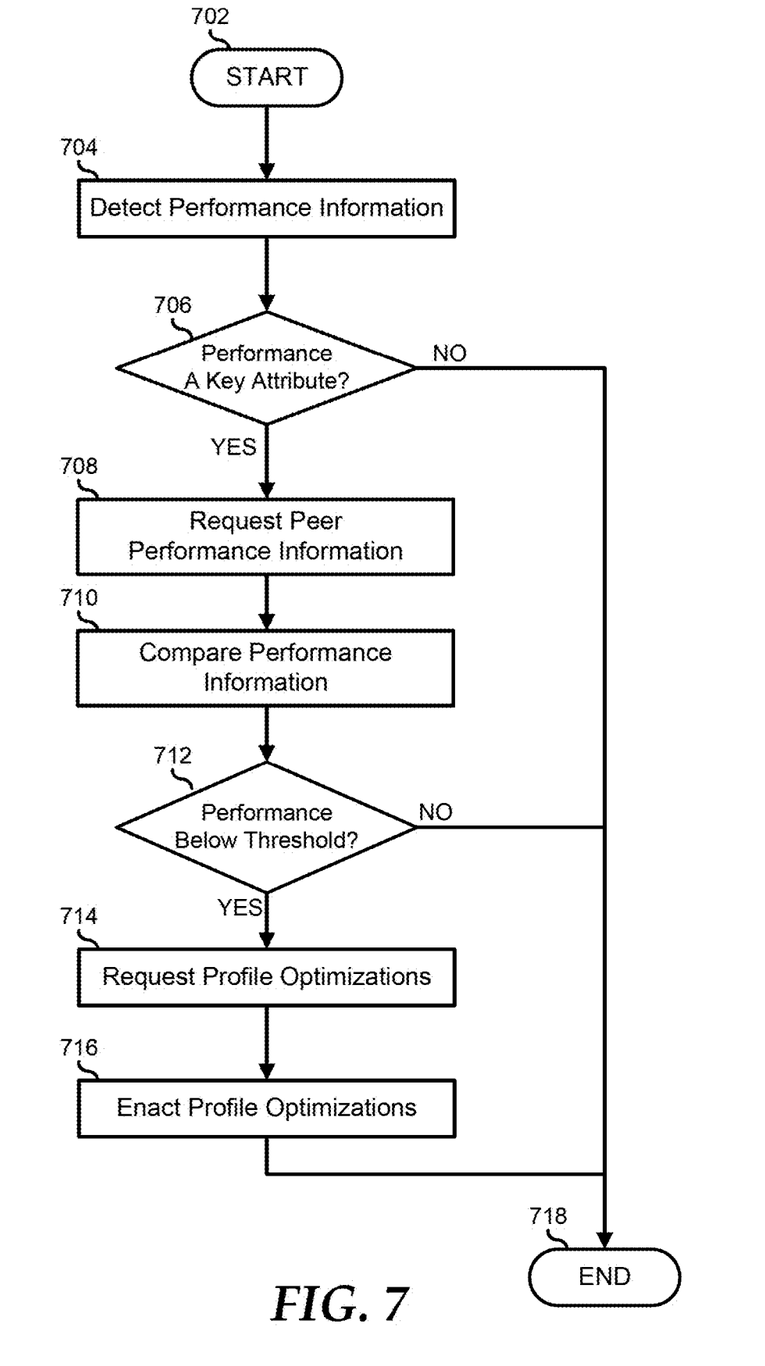
FIG. 7 is a flowchart illustrating a method of optimizing device performance and detecting performance issues in a device network according to an embodiment of the present disclosure.

FIG. 7 illustrates a method of optimizing device performance and detecting performance issues in a device network, starting at block 702. Performance information for a device in a device network is detected in block 704. For example, device 620 can detect performance information 622. A decision is made as to whether the performance information is associated with a key attribute for the performance of the device in decision block 706. If not, the "NO" branch of decision block 706 is taken and the method ends in block 718. If the performance information is associated with a key attribute for the performance of the device, the "YES" branch of decision block 706 is taken and the device requests the performance information from the devices peers in block 708. For example, if performance information 622 is a key attribute, then device 620 can request performance information 612 from device 610, and performance information 632 from device 630.

The performance information from the device is compared to the performance information from the peer devices in block 710. A decision is made as to whether the performance of the device is below a threshold based upon the comparison in decision block 712. In particular, a key attribute can be provided with a performance threshold based upon an aggregate performance measure of the peer devices, as determined by the peer performance information. For example, the average value of the performance levels for the key attribute can be calculated for the peer devices, and then the performance level for the key attribute for the subject device can be compared with the average. The threshold can then be a measure above or below the average for which an alert or corrective action should be taken. If the performance of the device is below a threshold based upon the comparison, the "NO" branch of decision block 712 is taken and the method ends in block 718.

If the performance of the device is below a threshold based upon the comparison, the "YES" branch of decision block 712 is taken and the device requests the profile information in block 714. For example, device 620 can request the functions, features, and operational settings from performance managers 614 and 634. In another embodiment, device 620 can request performance optimization setting from management system 640. The profile settings needed to optimize the performance of the device are enacted on the device in block 716, and the method ends in block 718.

Figure 8:
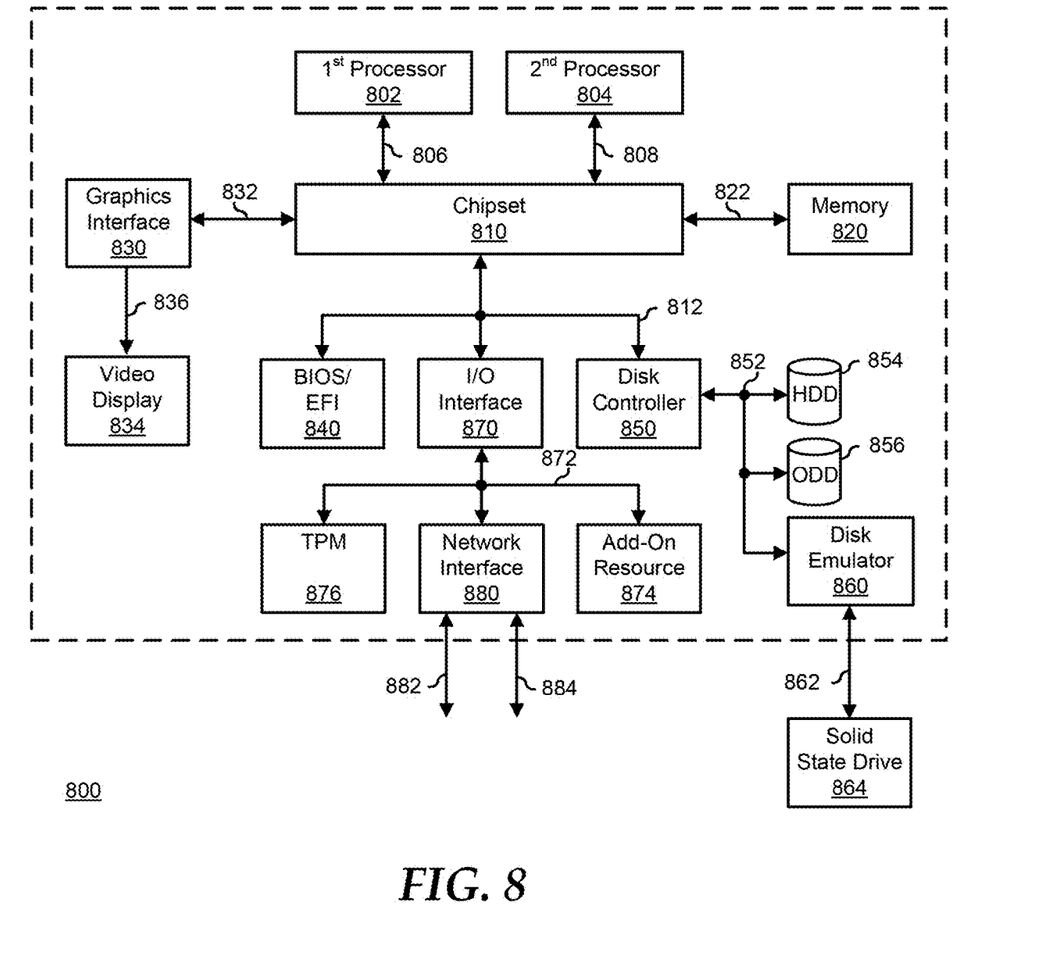
FIG. 8 is a block diagram illustrating a generalized information handling system according to an embodiment of the present disclosure.

FIG. 8 illustrates a generalized embodiment of information handling system 800. For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described above, and operates to perform one or more of the methods described above. Information handling system 800 includes a processors 802 and 804, a chipset 810, a memory 820, a graphics interface 830, include a basic input and output system/extensible firmware interface (BIOS/EFI) module 840, a disk controller 850, a disk emulator 860, an input/output (I/O) interface 870, and a network interface 880. Processor 802 is connected to chipset 810 via processor interface 806, and processor 804 is connected to the chipset via processor interface 808. Memory 820 is connected to chipset 810 via a memory bus 822. Graphics interface 830 is connected to chipset 810 via a graphics interface 832, and provides a video display output 836 to a video display 834. In a particular embodiment, information handling system 800 includes separate memories that are dedicated to each of processors 802 and 804 via separate memory interfaces. An example of memory 820 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 840, disk controller 850, and I/O interface 870 are connected to chipset 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 810 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 840 includes BIOS/EFI code operable to detect resources within information handling system 800, to provide drivers for the resources, initialize the resources, and access the resources. BIOS/EFI module 840 includes code that operates to detect resources within information handling system 800, to provide drivers for the resources, to initialize the resources, and to access the resources.

Disk controller 850 includes a disk interface 852 that connects the disc controller to a hard disk drive (HDD) 854, to an optical disk drive (ODD) 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits a solid-state drive 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O interface 870 includes a peripheral interface 872 that connects the I/O interface to an add-on resource 874, to a TPM 876, and to network interface 880. Peripheral interface 872 can be the same type of interface as I/O channel 812, or can be a different type of interface. As such, I/O interface 870 extends the capacity of I/O channel 812 when peripheral interface 872 and the I/O channel are of the same type, and the I/O interface translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as chipset 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a memory; and
   a processor connected to the memory and configured to:
   determine whether the information handling system is of a first class of devices;
   receive a first profile from a management system, the first profile being for the first class of devices;
   receive a second profile from the management system, the second profile being for a second class of devices, the second class being different from the first class, wherein the first profile and the second profile are private profiles;
   couple to a peer device via a peer-to-peer network;
   determine whether the peer device is of the first class of devices or the second class of devices;
   send the first profile to the peer device in response to determining that the peer device is of the first class of devices;
   detect first performance information for the information handling system;
   determine that the first performance information is associated with a key attribute;
   request second performance information from the peer device, in response to determining that the first performance information is associated with the key attribute;
   determine if a performance level of the information handling system is below a threshold based upon a comparison of the first and second performance information;
   determine a performance setting of the peer device that is associated with the second performance information;
   request setting information from the peer device, the setting information associated with the performance setting, in response to determining that the performance level is below the threshold;
   receive a performance optimization from the second information handling system; the performance optimization associated with the performance setting;
   enact the performance optimization on the information handling system;
   determine that the information handling system and the peer device are included in an ecosystem;
   send a third profile to the peer device in response to determining that the information handling system and the peer device are included in the ecosystem;
   operate in accordance with the third profile in response to determining that the information handling system and the peer device are included in the ecosystem, the third profile provides for operation of the information handling system in one of a first mode and a second mode, wherein the peer device operates in a third mode when the information handling system operates in the first mode and the peer device operates in a fourth mode when the information handling system operates in the second mode; and
   determine that a fourth profile on the peer device is to be replaced, wherein sending the first profile to the peer device is in further response to determining that the fourth profile is to be replaced.

2. The information handling system of claim 1, wherein in determining that the third profile is to be replaced the processor further determines that the third profile is an earlier profile than the first profile.

3. The information handling system of claim 1, wherein in determining that the third profile is to be replaced the processor further determines that a timestamp of the third profile has expired.

4. The information handling system of claim 1, wherein the processor further sends the second profile to the peer device in response to determining that the peer device is of the second class of devices.

5. The information handling system of claim 1, wherein the processor further authenticates the peer device, wherein sending the first profile is in response to authenticating the peer device, and wherein sending the second profile is in response to authenticating the peer device.

6. The information handling system of claim 1, wherein the processor further authenticates the peer device, and wherein sending the first profile is in response to authenticating the peer device.

7. The information handling system of claim 6, further comprising:
   a secure processor, wherein authenticating the peer device is by the secure processor.

8. A method comprising:
   determining, by an information handling system, that the information handling system is of a first class of devices;
   receiving a first profile from a management system, the first profile being for the first class of devices;
   receiving a second profile from the management system, the second profile being for a second class of devices, the second class being different from the first class, wherein the first profile and the second profile are private profiles;
   coupling to a peer device via a peer-to-peer network;
   determining whether the peer device is of the first class of devices or the second class of devices;
   sending the first profile to the peer device in response to determining that the peer device is of the first class of devices;
   determining that the information handling system and the peer device are included in an ecosystem;
   detecting first performance information for the information handling system;
   determine that the first performance information is associated with a key attribute;
   requesting second performance information from the peer device, in response to determining that the first performance information is associated with the key attribute;
   determining if a performance level of the information handling system is below a threshold based upon a comparison of the first and second performance information;
   determining a performance setting of the peer device that is associated with the second performance information;
   requesting setting information from the peer device, the setting information associated with the performance setting, in response to determining that the performance level is below the threshold;

receiving a performance optimization from the peer device, the performance optimization associated with the performance setting;

enacting the performance optimization on the information handling system;

determining that the information handling system and the peer device are included in an ecosystem;

sending a third profile to the peer device in response to determining that the information handling system and the peer device are included in the ecosystem;

operating in accordance with the third profile in response to determining that the information handling system and the peer device are included in the ecosystem, the third profile provides for operation of the information handling system in one of a first mode and a second mode, wherein the peer device operates in a third mode when the information handling system operates in the first mode and the peer device operates in a fourth mode when the information handling system operates in the second mode; and determining that a fourth profile on the peer device is to be replaced, wherein sending the first profile to the peer device is in further response to determining that the fourth profile is to be replaced.

9. The method of claim 8, wherein in determining that the third profile is to be replaced, the method further comprises:
determining that the third profile is an earlier profile than the first profile.

10. The method of claim 8, wherein in determining that the third profile is to be replaced, the method further comprises:
determining that a timestamp of the third profile has expired.

11. The method of claim 8, further comprising:
sending the second profile to the peer device in response to determining that the peer device is of the second class of devices.

12. The method of claim 8, further comprising:
authenticating the peer device, wherein sending the first profile is in response to authenticating the peer device, and wherein sending the second profile is in response to authenticating the peer device.

13. The method of claim 8, further comprising:
authenticating the peer device, and wherein sending the first profile is in response to authenticating the peer device.

14. The method of claim 13, wherein authenticating the peer device is by a secure processor.

* * * * *